(12) United States Patent
Kaiser

(10) Patent No.: US 6,453,005 B2
(45) Date of Patent: Sep. 17, 2002

(54) SIO$_2$-COATED MIRROR SUBSTRATE FOR EUV

(75) Inventor: Winfried Kaiser, Aalen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/756,018

(22) Filed: Jan. 5, 2001

Related U.S. Application Data

(63) Continuation of application No. PCT/EP99/04209, filed on Jun. 17, 1999.

(51) Int. Cl.$^7$ ............................................... G21K 1/02
(52) U.S. Cl. ........................ 378/84; 359/359; 359/883
(58) Field of Search .......................... 378/34, 84, 85; 359/350, 359, 360, 868, 871, 883, 884

(56) References Cited

U.S. PATENT DOCUMENTS 4,282,543 A    8/1981   Ihara et al.

FOREIGN PATENT DOCUMENTS

JP    64-53408    * 3/1989    ..................... 117/9

OTHER PUBLICATIONS

Patent Abstracts of Japan, Pub. No. 09318800. Pub. Date Dec. 12, 1997, Applicant: Japan Aviation Electron Ind Ltd; Inventor: Nishimoto Keiji.

Patent Abstracts of Japan, Pub. No. 04190200, Pub. date Jul. 8, 1992, Applicant: Ishikawajima Harima Heavy Ind; Inventor: Matsuki Nobuo.

Patent Abstracts of Japan, Pub. No. 01053408, Pub. Date Mar. 1, 1989, Applicant: Hitachi Ltd., Inventor: Nakagawa.

Patent Abstracts of Japan, Pub. No. 05067525, Pub. Date Mar. 19, 1993, Applicant: TDK Corp., Inventor: Narumiya.

* cited by examiner

*Primary Examiner*—David P. Porta

(57) ABSTRACT

Mirror substrate consisting of crystal, especially silicon crystal, on which an amorphous layer, especially a quartz glass layer, is applied.

14 Claims, 1 Drawing Sheet

SIO$_2$-COATED MIRROR SUBSTRATE FOR EUV

CROSS-REFERENCES TO RELATED APPLICATIONS

This is a continuation of PCT/EP99/04209 filed Jun. 17, 1999, which is pending.

Statement Regarding Federally Sponsored Research or Development

Not Applicable.

Reference to a Microfiche Appendix

Not Applicable.

BACKGROUND OF THE INVENTION

This invention relates to a mirror substrate, a mirror with such a mirror substrate, and a production process therefor, and also an EUV projection exposure device therewith.

1. Field of the Invention

Monocrystalline silicon is a preferred substrate material for robust mirrors with a high thermal loading and best shape stability.

For applications in the X-ray region, in particular for soft X-radiation, also termed "extreme ultraviolet" (EUV), extremely smooth surfaces with micro-roughness values in the angstrom range are required This is attained with so-called "super-polish".

It has been found by experience that silicon substrates can be homogeneously polished to this standard only poorly or not at all homogeneously over sufficiently large surfaces, particularly in the case of strongly curved surfaces.

2. Discussion of Relevant Art

The preferred application of such EUV mirrors is in EUV lithography, for the mirrors of illumination, mask and projection objective. Their quality of polishing is then decisive for the usability of the whole system. This follows, e.g., from K. Hoh, Bull. Electrotechn. Lab. 49, No. 12, October 1985, pp. 47–54; T. E. Jewell et al., Proc. SPIE, Vol. 1527 (1991); and David M. Williamson, OSA IODC Conference Paper LWA 2–1, pp. 181–184, Jun. 10, 1998.

An X-ray mirror is known from Japanese Patent Document JP-B2-96/032 592, in which a matrix with sintered SiC is coated with crystalline SiC, by which means a precisely smooth surface is obtained.

SUMMARY OF THE INVENTION

The invention has as its object the provision of a mirror substrate which combines the positive properties of the silicon single crystal substrate with outstanding "super-polish" properties.

This object is attained by a mirror substrate of crystal, wherein an amorphous cover layer is applied to the substrate, and the amorphous cover layer is covered with a multilayer reflecting layer. According to the invention, a thin, amorphous layer, e.g. of quartz glass, amorphous SiO$_2$, or Al$_2$O$_3$, is applied to a substrate member consisting of a crystal with low thermal expansion and high thermal conductivity (diamond, BN, SiC, silicon, as examples). A cover layer which is known to be well suited for "super-polish" is thereby prepared, without impairing the other properties of the substrate.

The invention also includes the following advantageous features:

The substrate consists of at least one of the following materials: diamond, BN, SiC, or silicon.

The cover layer consists of at least one of the following amorphous materials: quartz glass, SiO$_2$ or Al$_2$O$_3$.

The amorphous cover layer has a thickness in the range of 1 μm through 100 μm.

The micro-roughness of the amorphous cover layer is in the angstrom range.

The multilayer reflection layers are constituted for a wavelength region of 10 nm–20 nm, preferably 13 nm.

The mirror has a curved surface.

In a preferred production process for such a mirror, a substrate of crystal is shaped close to the final contour, an amorphous cover layer is deposited on the mirror side of the substrate, then an optical final polishing takes place and then a multilayer reflecting layer is applied.

Advantageously, the amorphous cover layer is deposited by means of CVD.

Advantageous application of mirrors according to the invention in EUV projection exposure devices comprises an EUV projection exposure device with an EUV source, an illuminating optics, a mask, a projection objective, and a wafer, wherein at least one mirror according to the invention is contained in the illuminating optics or in the projection objective.

BRIEF DESCRIPTION OF THE DRAWING

The invention will be described in more detail with reference to the drawing.

DETAILED DESCRIPTION OF PREFERRED EMBODIMENTS

Figure 1:
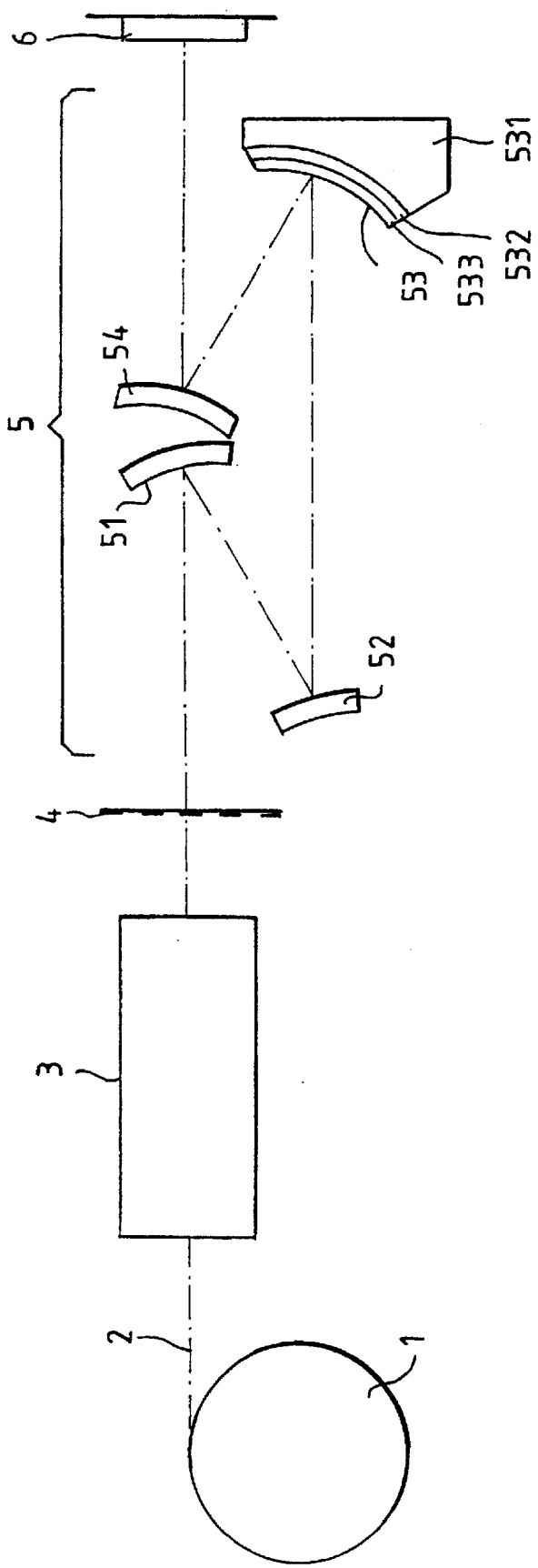
FIG. 1 shows schematically an EUV projection exposure device according to the invention.

The structure of such a EUV projection exposure device is known per se in numerous variants, e.g. from the above-cited reference Jewell and Williamson and the references cited therein. It includes a EUV source 1, e.g., a synchrotron or a laser plasma focus source, which produces a EUV beam 2 with, e.g., 13 nm wavelength, or another wavelength in the preferred range of about 10–20 nm, for which suitable multilayer reflecting layers (see the reflecting layer 533, below) are available.

An illuminating optics 3 serves for the suitable shaping of the EUV light as regards light conducting value, pupil filling, homogeneity, telecentricity, and the like. The mask 4 is thereby illuminated, shown as a transmission mask, but in many cases, however, preferably as a reflection mask. This mask 4 is imaged on a reduced scale by a projection objective 5 onto the object 6, the wafer.

The projection objective 5 contains, as in many known designs, four curved mirrors 51, 52, 53, 54. The structure according to the invention is representatively shown on mirror 53 of these, with the silicon single crystal substrate 531, the thin cover layer 532 of amorphous quartz, which with "super-polish" defines the highly accurate final contour of the mirror 53, and the multilayer reflecting layer 533. The latter gives, as a distributed Bragg reflector, a relatively high reflectivity of about 40–60% for a given spectral region.

The shape of the substrate 531 is determined by the requirements of mechanical stability, cooling, installation into a mount, matching to the beam path (vignetting), and the like. The usable surface is first precisely optically polished to near the final contour. The thin amorphous quartz layer is then deposited. The CVD process, for example, is suitable for this. Deformations of the mirror surfaces due to strains in the layer 532 can be kept to a minimum by the process parameters and after-treatments. They can be kept to a minimum by deflection during the shaping of the substrate 531 and by corresponding polishing of the quartz layer 532.

The amorphous quartz layer 532 thus does not serve as an adhesive base, diffusion barrier, or similar auxiliary layer of the multilayer reflection layers 533, but rather as the material which supports the contour of the mirror 53.

The final shaping processing, the so-called "super-polish", thus follows after the coating with the quartz layer 532.

A reflection layer 533, constructed as a multilayer EUV reflection layer, is then arranged on this layer 532 in a known manner.

Mirrors constructed in this manner can of course be used at any other place of the projection exposure device and also in other devices, e.g., X-ray microscopes or telescopes.

Each material of the substrate member, which is advantageous for the "bulk", such as the above mentioned materials of low thermal expansion and at the same time high thermal conductivity, can be provided with a thin cover layer of material which can well be polished to optical quality. Conformity as regards adhesion properties, strains, corrosion, and the like can be attained with known criteria.

I claim:

1. A mirror comprising:
    a substrate of crystal,
    an amorphous cover layer applied to said substrate,
    and a reflecting multilayer that covers said amorphous cover layer.
2. The mirror according to claim 1, wherein said substrate comprises at least one of the following materials: diamond, BN, SiC, and silicon.
3. The mirror according to claim 1, wherein said cover layer comprises at least one of the following amorphous materials: quartz glass, $SiO_2$, and $Al_2O_3$.
4. The mirror according to claim 1, wherein said amorphous cover layer has a thickness in the range of 1 $\mu$m through 100 $\mu$m.
5. The mirror according to claim 1, wherein said amorphous cover layer has a micro-roughness in the angstrom range.
6. The mirror according to claim 1, wherein said reflecting layer comprises a multilayer constituted for a wavelength region of 10 nm to 20 nm.
7. The mirror according to claim 6, wherein said multilayer is constituted for a wavelength region of 13 nm.
8. The mirror according to claim 1, wherein said mirror has a curved surface.
9. A production process for a mirror, comprising the steps of
    shaping a substrate of crystal close to its final contour,
    depositing an amorphous cover layer on a mirror side of said substrate,
    optical final polishing, and
    applying a reflecting layer.
10. The production process according to claim 9, comprising depositing said amorphous cover layer by CVD.
11. An EUV projection exposure device, comprising:
    an EUV source,
    an illuminating optics,
    a mask,
    a projection objective,
    a wafer, and
    at least one mirror comprising a substrate of crystal, an amorphous cover layer applied to said substrate, and a reflecting layer that covers said amorphous cover layer included in said illuminating optics or in said projection objective.
12. A mirror comprising:
    a substrate of crystal,
    an amorphous cover layer applied to said substrate,
    and a reflecting layer that covers said amorphous cover layer,
    wherein said substrate comprises at least one of the following materials: diamond, BN, and SiC.
13. A mirror comprising:
    a substrate of crystal,
    an amorphous cover layer applied to said substrate,
    and a reflecting layer that covers said amorphous cover layer,
    wherein said cover layer comprises $Al_2O_3$.
14. A mirror comprising:
    a substrate of crystal,
    an amorphous cover layer applied to said substrate,
    and a reflecting layer that covers said amorphous cover layer,
    wherein said amorphous cover layer has a micro-roughness in the angstrom range.

* * * * *